United States Patent [19]

Stafford

[11] 4,286,898

[45] Sep. 1, 1981

[54] RELEASABLE CONNECTION

[75] Inventor: Donald C. Stafford, Hinsdale, Ill.

[73] Assignee: Chicago Bridge & Iron Company, Oak Brook, Ill.

[21] Appl. No.: 66,934

[22] Filed: Aug. 16, 1979

[51] Int. Cl.$^3$ .................... E02B 17/00; F16L 53/00
[52] U.S. Cl. .................................. 405/224; 29/460; 114/230; 285/41; 405/251
[58] Field of Search ............... 405/130, 195, 211, 217, 405/224, 227, 234, 251; 29/405, 460; 285/41; 114/230; 403/11, 28

[56] References Cited

U.S. PATENT DOCUMENTS

| 2,992,017 | 7/1961 | Dritz | 285/41 X |
| 3,705,734 | 12/1972 | Rajakovics | 285/41 |
| 3,748,863 | 7/1973 | Pogonowski et al. | 405/224 |
| 3,990,253 | 11/1976 | Lea et al. | 405/224 X |

FOREIGN PATENT DOCUMENTS 52-32123  3/1977 Japan .......................................... 285/41

Primary Examiner—David H. Corbin
Attorney, Agent, or Firm—Merriam, Marshall & Bicknell

[57] ABSTRACT

A releasable connection comprising a first member removably inserted in a second member with space between adjacent opposing surfaces of the members; a solid mass of a material, in the space between the members, which firmly joins the members together; said solid material having substantial compressive, tensile and shear strength, and being convertible by heat at a sufficiently high temperature to a physical state in which it has much lower compressive, tensile and shear strength; and, apparatus associated with at least one of the members for supplying heat to the material.

The material, for example, may be ice, a low melting metal or a polymeric material.

The releasable connection can be used onshore or offshore. It can be used to releasably secure an offshore structure to a seafloor, such as in the artic, using ice as the material.

12 Claims, 9 Drawing Figures

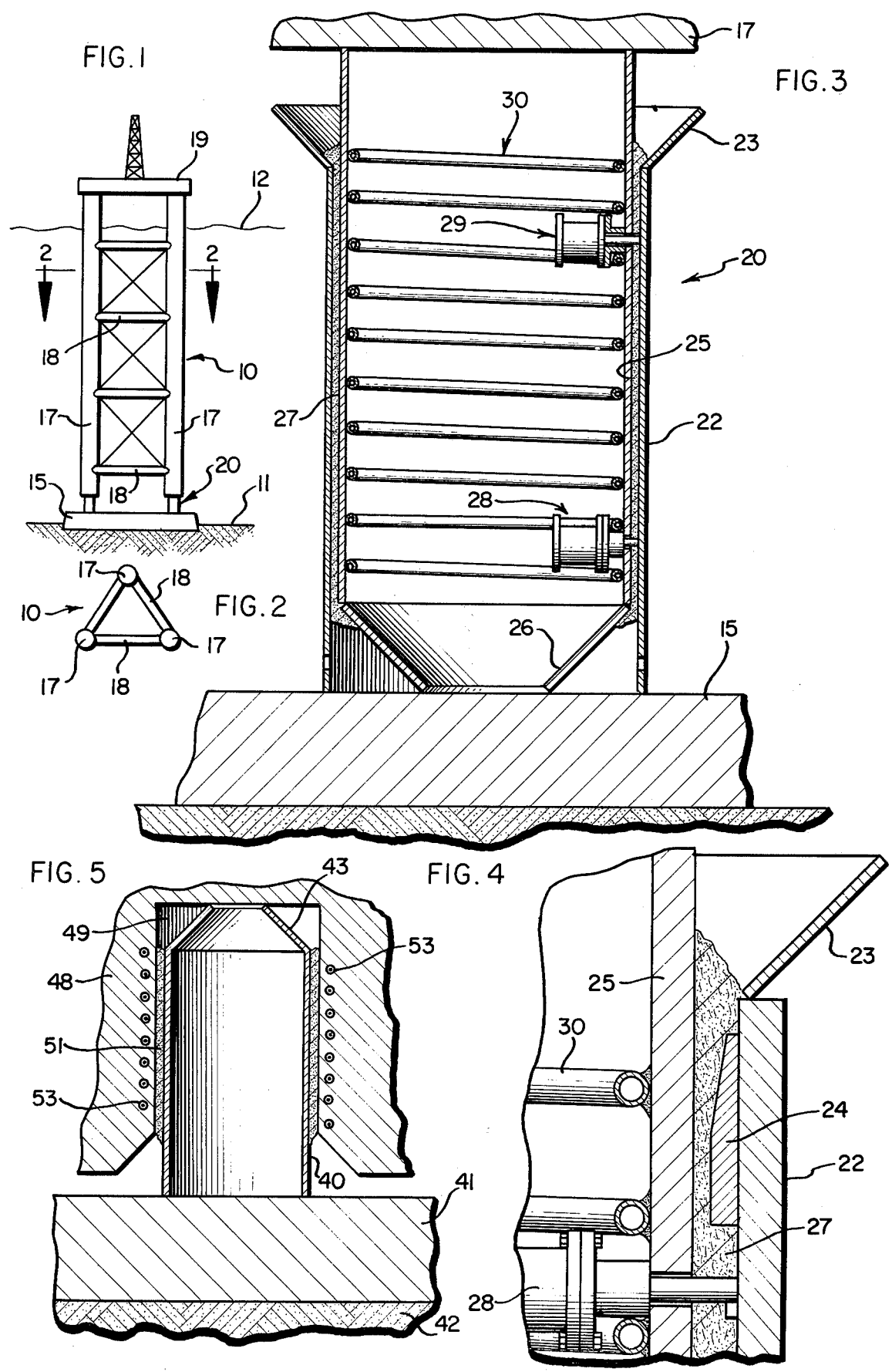

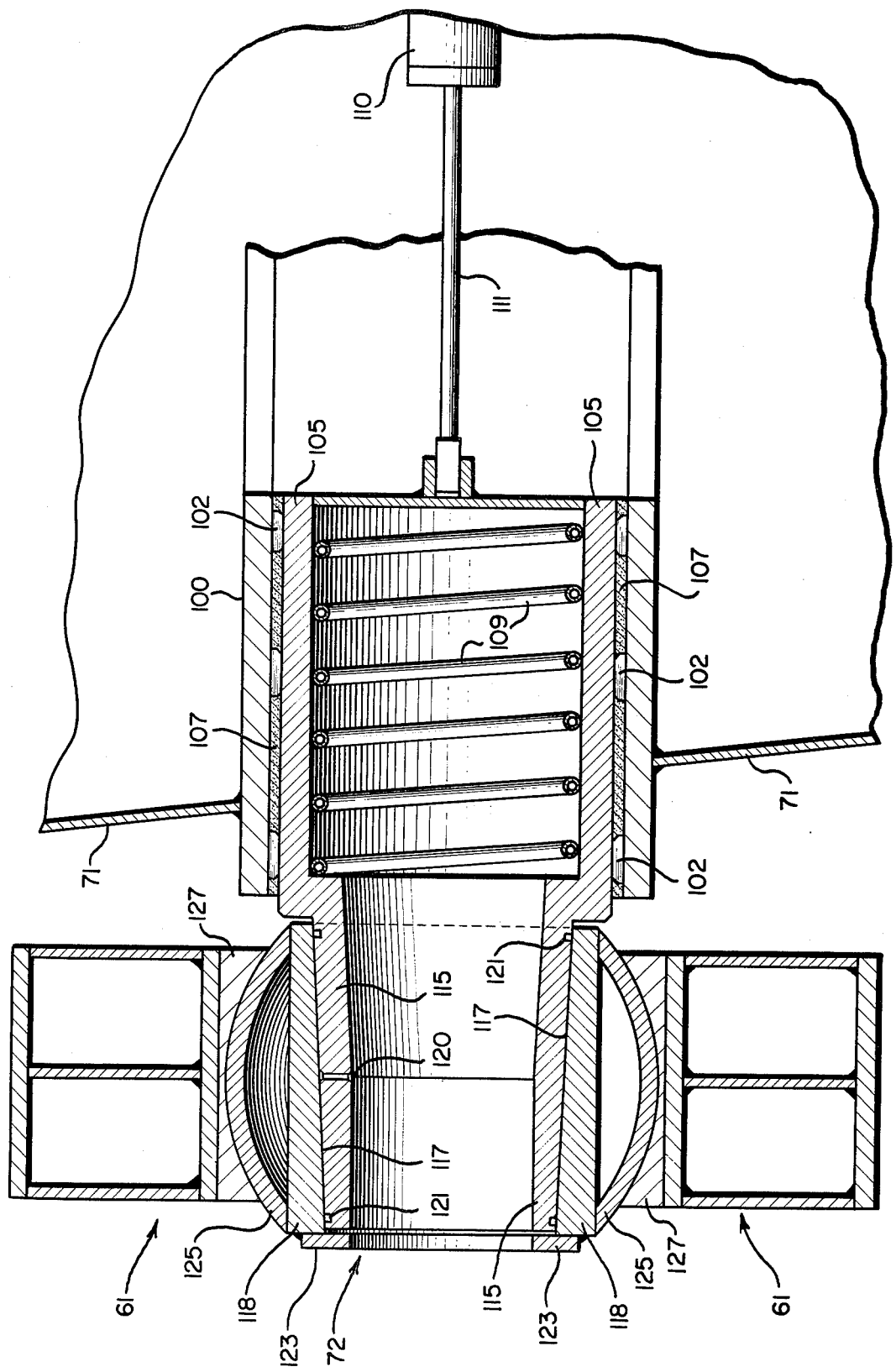

RELEASABLE CONNECTION

This invention relates to apparatus and methods of connecting two members together. More particularly, this invention is concerned with a releasable connection having two members fastened or joined together by a solid material which loses its strength upon heating, thereby effecting release of the two members for physical separation.

It is often necessary industrially and commercially to connect two members together in a strong and reliable manner. Such connections are made both permanent and semi-permanent or releasable. Releasable connections are sometimes required because an object may have to be moved for one or more reasons.

One type of connection in use is produced by loosely inserting one member inside of a second member and filling the space between the members with a liquid material which hardens or solidifies. Such a connection is generally of a permanent nature since no ready means is provided for removing or otherwise acting on the solidified material to separate the two members. In addition, such a connection is often in a remote area or inaccessible place, thus further complicating separation of the members. The described connection, however, is broadly very useful because of its inherent strength and uncomplicated construction so that if it could be made readily releasable, quickly or in a relatively short time, it could be used even more extensively than at present.

According to the present invention, there is provided a releasable connection comprising a first member removably inserted in a second member with space between adjacent opposing surfaces of the members; a solid mass of a material, in the space between the members, which firmly joins the members together; said solid material having substantial compressive, tensile and shear strength, and being convertible by heat at a sufficiently high temperature to a physical state in which it has much lower compressive, tensile and shear strength; and means associated with at least one of the members for supplying heat to the material.

The solid material used in the connection can be one which readily liquefies, vaporizes or degrades upon application of heat. In addition, the solid material can be one which is only solid at a temperature below the surrounding ambient temperature, i.e., one which requires cooling or refrigeration to convert it from a liquid to solid, as, for example, water being cooled to ice. A reinforcing material can be included in the solid material to increase its strength. Particulate materials such as sand, glass fibers, wire, steel wool and cellulose fibers can be used for this purpose.

The means for supplying heat to the solid material, to release the connection, will generally include apparatus or equipment for supplying heat by a gas, liquid, electric resistance, or a combination of two or more such means.

The means for supplying heat to the solid material can be in the first member, or the second member, or both members.

A suitable means also can be associated with one or both of the members for cooling the material in the space between the members if necessary to first solidify it, and to then maintain it solid. The cooling means can include means for effecting cooling by a gas or a liquid.

The described connection is particularly useful in securing an offshore tower in place on a seafloor, especially using ice as the solid material. The ice can be formed in the space between the members in situ by freezing water. The strength of the ice can be increased greatly by including in it a solid reinforcing material such as a particulate material like sand, an open-cell polymeric foam, a fibrous material like glass fibers or steel wool or cellulose pulp, metal or polymeric screening or wire.

Other uses for the connection are on land, as well as on or to a vessel, such as a ship or barge.

The invention will be described further in conjunction with the attached drawings, in which:

FIG. 1 is an elevational view of an offshore tower secured to a seafloor by use of releasable connections according to the invention;

FIG. 2 is a sectional view taken along the line 2—2 of FIG. 1;

FIG. 3 is a vertical sectional view of one of the three releasable connections used on the tower of FIG. 1;

FIG. 4 is an enlarged view of part of the releasable connection shown in FIG. 3;

FIG. 5 is a vertical sectional view of a second embodiment of releasable connection provided by the invention;

FIG. 9 is a sectional view of one of the two releasable connections by which the yoke shown in FIGS. 6 and 7 is connected to the ship.

So far as is practical, the same elements or parts will be identified by the same numbers in the various views of the drawings.

Figure 6:
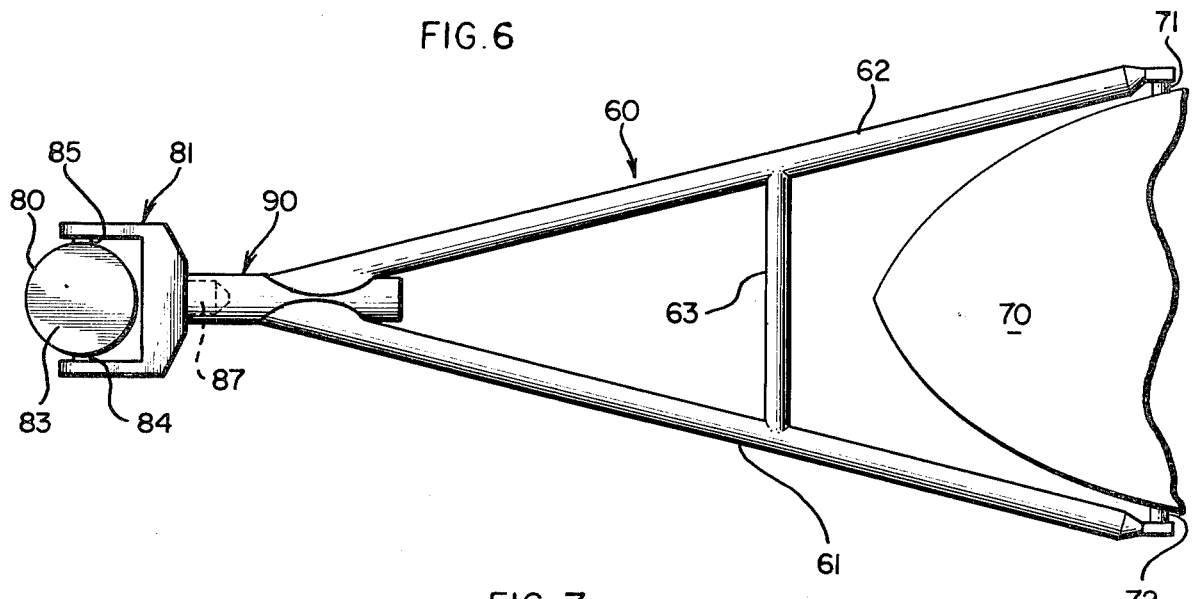
FIG. 6 is a partial plan view of a ship moored to an offshore tower by means of a mooring yoke having releasable connections to the tower and the ship.

With reference to FIGS. 1 and 2, the offshore tower 10 rests on and is secured to seafloor 11. The tower 10 extends above sea level 12. The tower 10 is supported by base 15 which rests on the seafloor. Piles, not shown, can be driven into the seafloor to hold base 15 in place.

Tower 10 has three vertical legs 17 of metal tubes arranged in a triangular pattern. Horizontal pipes 18 secure the legs 17 in rigid, spaced-apart arrangement. Platform 19 is supported on the top of legs 17.

Each of the three vertical legs 17 is secured at the lower end to the base 15 by means of a releasable connector 20 as is shown in greater detail in FIGS. 3 and 4.

Each releasable connector 20 includes a tubular first member 22 extending upwardly from, and joined to, base 15. The top portion 23 of first member 22 is frustoconically shaped outwardly to facilitate insertion of tubular second member 25 into the first member 22. Axially positioned bar guides 24 are arranged around the inside of second member 22 to minimize frictional sliding resistance and to maintain the first member centered in the second member. The upper end of the second member is joined to the bottom of leg 17. The lower end portion 26 of second member 25 is frustoconically shaped inwardly to further aid its entry into first member 22.

Hydraulic rams 28 and 29 are provided to temporarily hold the first member 22 inside of the second member 25 after the tower 20 has been lowered into place.

Inside of second member 25 is a tubular spiral 30 located close to its inside surface. Conduits, not shown, extend from the top and bottom ends of tubular spiral 30 up to the tower platform 19. By means of the conduits, a fluid can be circulated through the spiral 30 to cool or heat the second member 25 and the space between the first member 22 and the second member 25.

In the embodiment shown in FIGS. 1 to 4, the space between the first member 22 inner surface, and the outer surface of second member 25, is occupied by a solid unitary mass of ice 27 formed in situ by cooling the water therein to freezing. A reinforcing material, such as sand, can be incorporated in the water before the water is frozen to ice to increase its strength.

A refrigerated gas or liquid can be circulated through the spiral 30 to effect the desired cooling. Ethylene glycol is a suitable liquid for this purpose. Refrigerants such as ammonia and tetrafluoroethylene can also be used.

When it is desired to release the tower from base 15, a warm or hot fluid can be circulated through spiral 30 to melt the ice and thereby release the connection.

Insulation can be placed around the connection as desired to minimize heat transfer during freezing of the water and subsequent melting of the ice in the connection.

The described releasable connection is particularly useful for securing a tower in an ocean which is very cold, such as off the north coast of Alaska or Canada, since the ocean is nearly at freezing at such locations, thereby making it relatively easy to cool the water in the connection. In addition, there is minimal heat exchange between the connection and the ocean at such locations so that only slight cooling is needed to maintain the ice solid in the connection. However, if a large pressure ridge or an iceberg is observed moving toward the tower, the connections can be quickly released and the tower moved out of the way.

Instead of filling the space between the members 22 and 25 with ice, one could use a polymeric material which loses its strength by melting or degradation upon heating. Thus, an epoxy type polymer can be used since the resulting connection would be strong. Upon the application of heat through spiral 30, the epoxy can be degraded, such as at about 500° F., and the connection released. Steam could be circulated through the spiral to provide the required heat.

A second embodiment of releasable connection is shown in FIG. 5. In this embodiment, tubular stud member 40 extends upwardly from foundation 41 supported on land 42. The top 43 of stud 40 is sloped conically inwardly. The second member 48 has a circular hole 49 in which stud 40 is positioned in a loose manner so that there is space between it and the hole wall. The said space is filled by a solid polymeric material 51 which may be put in place by any suitable means. Tubular spiral 53 is located in member 48 near the wall of hole 49. A hot fluid can be circulated through the spiral to heat the solid polymeric material 51 until it melts or degrades to thereby release the connection.

Figure 7:
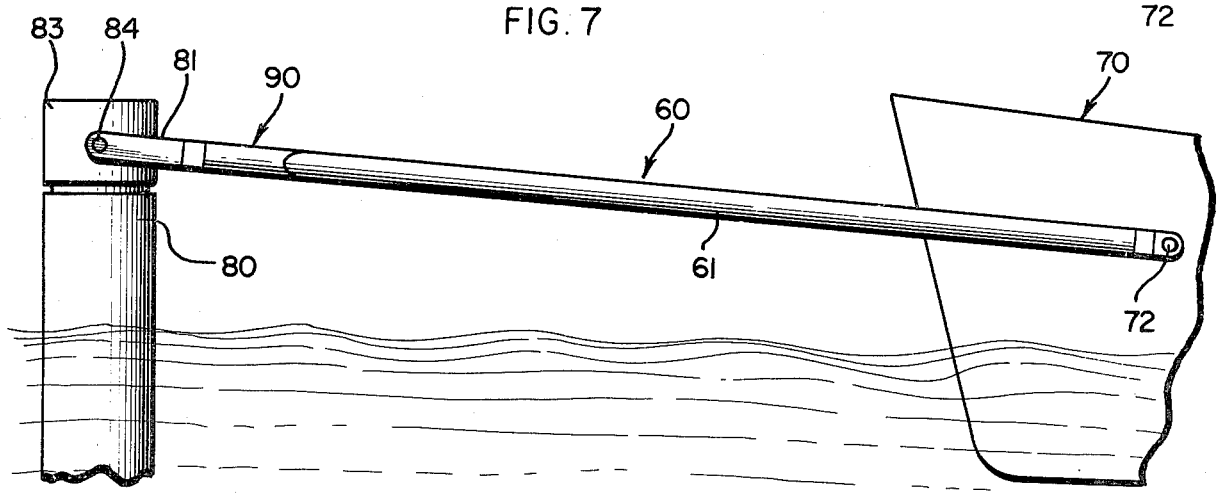
FIG. 7 is a partial elevational view of the moored ship and tower shown in FIG. 6.
Figure 8:
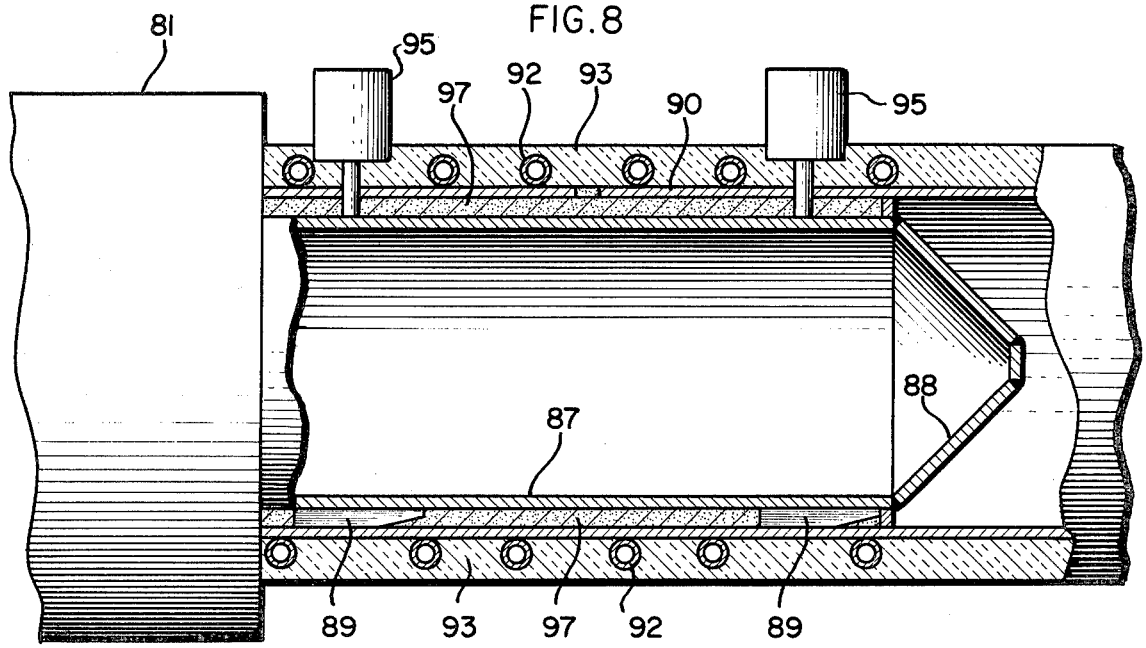
FIG. 8 is a partial sectional view of the releasable connection by which the yoke is connected to the tower.

A third embodiment of the invention is shown in FIGS. 6 to 8. As shown in FIGS. 6 and 7, a rigid ship yoke 60, having a pair of arms 61 and 62 and cross-brace 63, is pivotally connected at one end to ship 70 through trunnions 71 and 72. The other end of ship yoke 60 is connected to tower yoke 81 on the top of offshore tower 80 articulatedly secured to the seafloor.

The tower yoke 81 is connected to swivel 83, on the top of the tower, by trunnions 84 and 85. This arrangement permits the ship to weather vane while moored and also accommodates wave and wind action on the tower and ship.

The ship yoke 60 and the tower yoke 81 are joined together by a releasable connection according to the invention. Extending outwardly from tower yoke 81 is a first member tubular stud 87 having an axially directed conical end 88 (FIGS. 6 and 7). Stud 87 is mounted in yoke 81 so that it can freely rotate axially to accommodate rolling of the moored ship without applying torque to the mooring apparatus. Mounted on the outside of stud 87 are axially positioned centering bars 89 radially arranged on the stud surface. The end of ship yoke 60 has a tubular second member 90 into which stud 87 is removably inserted. Tubular spiral 92 is circumferentially wound over the surface of member 90 and then both are covered with insulation 93. Also mounted on the outside of member 90 is a plurality of hydraulic rams 95 which are used to secure stud 87 in member 90 while the solid material 97 is deposited in the space between both such members. The solid material may be an epoxy-type material; however, any other solid material having adequate strength, but which weakens upon application of a moderate amount of heat, can be used.

The mooring arrangement described with respect to FIGS. 6 to 8 can be used to moor a ship offshore when the ship is to be on location for a considerable period of time. For example, it can be used to moor an oil tanker to which oil is delivered from offshore wells for collection and/or processing and subsequent loading onto other ships. Whenever it is desired to move the ship to a new location, or to move it out of the way of a storm, the releasable connection can be activated by passing steam from ship 70 through the spiral tube 92 until the epoxy degrades and softens. The ship yoke 60 can then be pulled free of the tower yoke 81.

The invention is further illustrated in FIG. 9 in which a releasable connection according to the invention is used to join the ship yoke 60 to ship 70. As shown in FIG. 9, the ship 70 has a horizontally positioned tubular first member 100 extending through its hull or side. Inside of member 100 are a plurality of axially extending radially positioned spaced-apart bars 102. A cylindrical second member 105 is slidably inserted in member 100 and a unitary mass of solid material 107 is used to fill the space between the members. Tubular spiral 109 is positioned against the inside surface of second member 105. Conduits, not shown, extend from each end of spiral 109 so that a fluid can be circulated through the spiral to heat or cool the space between members 100 and 105. Hydraulic cylinder 110, stationarily mounted to the ship 70, has rod 111 operably extending therefrom into connection with member 105 so that it can be moved axially in member 100.

Extending outwardly from member 105 is a tapered neck 115 which fits removably into the tapered bore 117 in sleeve 118. A port 120 in neck 115 permits introduction of hydraulic liquid along the surface of tapered bore 117 to facilitate axial release of neck 115 from sleeve 118. Seals 121 prevent the hydraulic liquid from escaping during the loosening operation.

A flat ring 123 is mounted on the end of sleeve 118 and bolts, not shown, extend through the ring into the end of neck 115 to pull it tightly into the sleeve. The bolts are removed when neck 115 is to be withdrawn from sleeve 118.

Sleeve 118 is fixedly joined to spherical segment 125 which is rotatably located in bearing block 127 in ship yoke arm 61. This arrangement permits the ship yoke 60 to rotate about a horizontal axis and also accommodates out of alignment between the neck 115 and sleeve 118.

It should be understood that an apparatus like that shown in FIG. 9 is also located on the starboard side of the ship and connects arm 62 to the ship.

When it is desired to disconnect the ship yoke 60 from ship 70, the bolts holding neck 115 in ring 123 are removed and then a hot fluid is circulated through tubular spiral 109 to cause solid material 107 to become liquid or degrade so as to substantially reduce its strength. If needed, hydraulic liquid can be fed by port 120 between neck 115 and sleeve 117 to help loosen the frictional bond between the mating surfaces of these two parts. Rod 111 is then actuated by hydraulic cylinder 110 to move member 105 inwardly thereby pulling neck 115 out of sleeve 118. The described operation is performed on both sides of the ship so as to free each arm 61 and 62. The ship yoke 60, once free, can be handled as subsequently desired.

It should be obvious from the above description to replace the tubular spirals 30, 53, 92 and 109 with an electrical resistance heater when only heating is required. However, a separate electrical resistance spiral heater can be placed between the tubular spirals so that systems are available for separately cooling and heating the material in the space between the two telescoped first and second members.

The foregoing detailed description has been given for clearness of understanding only, and no unnecessary limitations should be understood therefrom, as modifications will be obvious to those skilled in the art.

What is claimed is:

1. A releasable connection comprising:
    a first member removably inserted in a second member with space between adjacent opposing surfaces of the members,
    means adapted to retractably extend from the first member to the second member to temporarily hold the first member inside the second member in spaced-apart arrangement,
    a solid mass of a material, in the space between the members, which firmly joins the members together,
    said solid material having substantial compressive, tensile and shear strength, and being convertible by heat at a sufficiently high temperature to a physical state in which it has much lower compressive, tensile and shear strength, and
    means associated with at least one of the members for supplying heat to the material.

2. A releasable connection according to claim 1 in which one of the members is secured to a sea floor and the other member is joined to an upwardly projecting structure.

3. A releasable connection according to claim 2 in which the upwardly projecting structure is an offshore tower.

4. A releasable connection according to claim 1 in which the material is $H_2O$.

5. Apparatus comprising a plurality of spaced-apart first members mounted firmly on a sea floor,
    a plurality of spaced-apart second members joined to the lower part of an offshore tower platform,
    each first member terminating substantially beneath sea level and substantially beneath and out of contact with the tower platform,
    each first member being paired with a second member, and one of the members of each pair being removably inserted in the other member of the pair, with space between adjacent opposing surfaces of the members,
    a solid unitary mass of a material, in the space between the paired member surfaces, which firmly joins the members together,
    said solid material being convertible by heat at a sufficiently high temperature to a physical state in which it has only low compressive, tensile and shear strength, and
    means associated with at least one of the members for controllably supplying heat to the material.

6. Apparatus according to claim 5 including means to cool the material to solidify it and maintain it solid.

7. Apparatus according to claim 6 in which the solid material is ice.

8. Apparatus according to claim 5 in which the means for supplying heat includes means for supplying the heat by a gas, liquid or electric resistance heater.

9. Apparatus according to claim 7 in which the ice contains a solid reinforcing material distributed therein.

10. A releasable connection comprising:
    a first member removably inserted in a second member with space between adjacent opposing surfaces of the members,
    a solid mass of a material, in the space between the members, which firmly joins the members together, and with said material only being solid at a temperature below the surrounding ambient temperature,
    said solid material having substantial compressive, tensile and shear strength, and being convertible by heat at a sufficiently high temperature to a physical state in which it has much lower compressive, tensile and shear strength, and
    means associated with at least one of the members for first cooling said material in the space between the members to solidify it and form said solid mass and then to prevent the solid mass from melting.

11. A releasable connection according to claim 10 including means for supplying heat to the solid mass to melt the same, with the heat being supplied by a gas, liquid or electric resistance.

12. Apparatus according to claim 10 including means adapted to extend from the first member to the second member to temporarily hold the first member inside the second member in spaced-apart arrangement.

* * * * *